(12) United States Patent
Coste et al.

(10) Patent No.: US 11,865,865 B2
(45) Date of Patent: *Jan. 9, 2024

(54) TIRE COMPRISING A CRUMB RUBBER

(71) Applicant: COMPAGNIE GENERALE DES ETABLISSEMENTS MICHELIN, Clermont-Ferrand (FR)

(72) Inventors: Nathalie Coste, Clermont-Ferrand (FR); Severin Dronet, Clermont-Ferrand (FR); Vincent Lafaquiere, Clermont-Ferrand (FR); Claire Rannoux, Geneva (CH)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 261 days.

This patent is subject to a terminal disclaimer.

(21) Appl. No.: 17/416,152

(22) PCT Filed: Dec. 13, 2019

(86) PCT No.: PCT/FR2019/053062
§ 371 (c)(1),
(2) Date: Jun. 18, 2021

(87) PCT Pub. No.: WO2020/128255
PCT Pub. Date: Jun. 25, 2020

(65) Prior Publication Data
US 2022/0055406 A1 Feb. 24, 2022

(30) Foreign Application Priority Data

Dec. 19, 2018 (FR) ................................. 18 73399
Jan. 30, 2019 (FR) ................................. 19 00827

(51) Int. Cl.
*B60C 1/00* (2006.01)
*C08L 17/00* (2006.01)
*C08L 7/00* (2006.01)

(52) U.S. Cl.
CPC ............... *B60C 1/00* (2013.01); *C08L 7/00* (2013.01); *C08L 17/00* (2013.01); *C08L 2207/04* (2013.01)

(58) Field of Classification Search
CPC ............... B60C 1/00; C08L 17/00; C08L 7/00
USPC ........................................................ 523/156
See application file for complete search history.

(56) References Cited

U.S. PATENT DOCUMENTS

| | | | |
|---|---|---|---|
| 5,227,425 A | 7/1993 | Rauline | |
| 5,852,099 A | 12/1998 | Vanel | |
| 5,900,449 A | 5/1999 | Custodero et al. | |
| 6,420,488 B1 | 7/2002 | Penot | |
| 6,536,492 B2 | 3/2003 | Vasseur | |
| 6,610,261 B1 | 8/2003 | Custodero et al. | |
| 6,747,087 B2 | 6/2004 | Custodero et al. | |
| 6,975,396 B2 | 12/2005 | Custodero et al. | |
| 7,135,517 B2 | 11/2006 | Simonot et al. | |
| 7,202,295 B2 | 4/2007 | Simonot et al. | |
| 7,256,233 B2 | 8/2007 | Simonot et al. | |
| 7,425,313 B2 | 9/2008 | Custodero et al. | |
| 7,820,771 B2 | 10/2010 | Lapra et al. | |
| 8,461,269 B2 | 6/2013 | Varagniat et al. | |
| 8,883,929 B2 | 11/2014 | Gandon-Pain et al. | |
| 11,046,838 B2 | 6/2021 | Thomasson et al. | |
| 11,396,208 B2 | 7/2022 | Tregouet et al. | |
| 2001/0034389 A1 | 10/2001 | Vasseur | |
| 2002/0004549 A1 | 1/2002 | Custodero et al. | |
| 2003/0202923 A1 | 10/2003 | Custodero et al. | |
| 2004/0030017 A1 | 2/2004 | Simonot et al. | |
| 2005/0171264 A1 | 8/2005 | Simonot et al. | |
| 2005/0267242 A1 | 12/2005 | Custodero et al. | |
| 2006/0009564 A1 | 1/2006 | Simonot et al. | |
| 2007/0231532 A1 | 10/2007 | Walters et al. | |
| 2008/0026244 A1 | 1/2008 | Barbotin et al. | |
| 2008/0132644 A1 | 6/2008 | Lapra et al. | |
| 2009/0270558 A1 | 10/2009 | Gandon-pain et al. | |
| 2010/0022714 A1 | 1/2010 | Varagniat et al. | |
| 2010/0168306 A1 | 7/2010 | Barbotin et al. | |
| 2011/0021702 A1 | 1/2011 | Gandon-Pain et al. | |
| 2011/0039976 A1 | 2/2011 | Vasseur | |
| 2012/0208948 A1 | 8/2012 | Gandon-Pain et al. | |
| 2020/0016939 A1 | 1/2020 | Merino Lopez | |
| 2020/0095401 A1 | 3/2020 | Thomasson et al. | |
| 2020/0101793 A1 | 4/2020 | Tregouet et al. | |
| 2021/0130592 A1 | 5/2021 | Thomasson et al. | |
| 2022/0064412 A1 | 3/2022 | Coste et al. | |

FOREIGN PATENT DOCUMENTS

| | | | |
|---|---|---|---|
| CN | 1976987 A | 6/2007 | |
| EP | 0501227 A1 | 9/1992 | |
| EP | 0735088 A1 | 10/1996 | |
| EP | 0810258 A1 | 12/1997 | |
| FR | 3060586 A1 * | 6/2018 | ............... B60C 1/00 |
| FR | 3060588 A1 | 6/2018 | |
| FR | 3060590 A1 | 6/2018 | |
| GB | 2406273 A | 3/2005 | |

(Continued)

OTHER PUBLICATIONS

International Search Report dated Mar. 6, 2020, in corresponding PCT/FR2019/053062 (4 pages).

(Continued)

*Primary Examiner* — Deve V Hall
(74) *Attorney, Agent, or Firm* — VENABLE LLP

(57) ABSTRACT

A tire comprises a rubber layer comprising from 50% to 100% by mass of a rubber crumb having a ratio of the chloroform extract to the acetone extract of less than 2, the chloroform and acetone extracts being expressed as percentages by mass.

18 Claims, No Drawings

(56) References Cited

FOREIGN PATENT DOCUMENTS

| JP | 2016-108381 A | 6/2016 |
|---|---|---|
| NO | 2006/069792 A1 | 7/2006 |
| WO | 97/36724 A2 | 10/1997 |
| WO | 99/16600 A1 | 4/1999 |
| WO | 99/28376 A2 | 6/1999 |
| WO | 00/005300 A1 | 2/2000 |
| WO | 00/005301 A1 | 2/2000 |
| WO | 00/73372 A1 | 12/2000 |
| WO | 02/053634 A1 | 7/2002 |
| WO | 2004/003067 A1 | 1/2004 |
| WO | 2004/056915 A1 | 7/2004 |
| WO | 2006/069793 A1 | 7/2006 |
| WO | 2008/003434 A1 | 1/2008 |
| WO | 2008/003435 A1 | 1/2008 |
| WO | 2009/083160 A1 | 7/2009 |
| WO | 2010/039327 A1 | 4/2010 |
| WO | 2018/055537 A1 | 3/2018 |
| WO | 2018/115715 A1 | 6/2018 |
| WO | 2018/115718 A1 | 6/2018 |
| WO | 2018/115720 A1 | 6/2018 |

OTHER PUBLICATIONS

Solid Waste Treatment and Resource Utilization, edited by Z. Lei, p. 191, China University of Mining and Technology Press (Xuzhou, Dec. 2017, 1st edition)(6-page translation).

Handbook of Plastic and Rubber Additives, edited by L. Shiguang, p. 557, Beijing Light Industry Press (Beijing, Sep. 1995, 1st edition)(4-page translation).

* cited by examiner

TIRE COMPRISING A CRUMB RUBBER

BACKGROUND

The invention relates to tires comprising at least one rubber layer comprising a rubber crumb.

Indeed, it is at the current time advantageous for tire manufacturers to find solutions to lower the costs of rubber compositions without penalizing the performance of the tires using these compositions.

It is also of interest to the manufacturers to promote the recycling of end-of-life tires into new tires with a view to reducing the environmental impact of their activity.

The grinding or the micronization of vulcanized rubber compositions produces granules or particles generally referred to as rubber crumbs.

In this context, it is known in the prior art that rubber crumbs can be used in tires. For example, document WO 2018/115715 proposes the use in a tire sidewall of compositions which may comprise 23 phr, or 30 phr, or up to 50 phr or 54 phr of various crumbs. These amounts correspond to percentages by mass of less than 25% by mass in the compositions. Also, document WO 2018/055537 describes solutions consisting in using tire crumbs in tire compositions, in variable amounts ranging from more than 20% by mass, up to more than 80% by mass. The objective in this document is to lower the cost of the compositions and to promote recycling.

The applicant has now found a means of improving the stiffness while limiting the impact on the properties at break. In fact, the applicant has shown that tire layers comprising more than 50% by mass of specific rubber crumb had increased stiffness with a lower adverse effect on the properties at break.

SUMMARY

The invention therefore relates to a tire comprising a rubber layer comprising from 50% to 100% by mass of a rubber crumb having a ratio of the chloroform extract to the acetone extract of less than 2; the chloroform and acetone extracts being expressed as percentages by mass.

DETAILED DESCRIPTION

The tire according to the invention will preferably be selected from tires intended to equip a two-wheeled vehicle, a passenger vehicle, or else a "heavy-duty" vehicle (that is to say, underground trains, buses, off-road vehicles, heavy road transport vehicles, such as trucks, tractors or trailers), or else aircraft, construction equipment, heavy agricultural vehicles or handling vehicles.

Constituents of the Layer of the Tire

The layers of the tire according to the invention are based on 50% to 100% by mass of a rubber crumb having a ratio of the chloroform extract to the acetone extract of less than 2; the chloroform and acetone extracts being expressed as percentages by mass.

The expression "layer based on" or "composition based on" should be understood as meaning a layer/composition comprising the mixture and/or the product of the in situ reaction of the various base constituents used, some of these constituents being able to react and/or being intended to react with each other, at least partially, during the various phases of manufacture of the composition or during the subsequent curing, modifying the composition as it is prepared at the start.

Moreover, for the purposes of the present patent application, the term "phr", which is well known to those skilled in the art, means part by weight per hundred parts of elastomers, within the meaning of the preparation of the composition before curing. That is to say, in the case of the presence of a rubber crumb in a composition, the term "phr" means part by weight per hundred parts of "new" elastomers, thus excluding from the base 100 the elastomers contained in the rubber crumb. Of course, the crumb itself has a rubber composition, the ingredients of which can also be expressed in phr, the term "phr" in this case denoting the amount in parts by weight per hundred parts of elastomers, within the meaning of the distinctive composition of the crumb.

In the present description, unless expressly indicated otherwise, all the percentages (%) shown are percentages by mass, also referred to, without distinction, as mass percentages. Furthermore, any interval of values denoted by the expression "between a and b" represents the range of values extending from more than a to less than b (that is to say, limits a and b excluded), while any interval of values denoted by the expression "from a to b" means the range of values extending from a up to b (that is to say, including the strict limits a and b).

The compounds mentioned in the description may be of fossil or biobased origin. In the latter case, they may be partially or completely derived from biomass or be obtained from renewable starting materials derived from biomass. Polymers, plasticizers, fillers, etc. are notably concerned.

Rubber Crumb

The composition of the invention also comprises a rubber crumb (abbreviated to "crumb" in the remainder of the text).

The crumbs are in the form of granules (or grains), optionally put into the form of a rubber slab. Generally, rubber crumbs result from a grinding or from a micronization of cured rubber compositions already used for a first application, for example in tires; they are a product of recycling of the materials. The crumbs are preferably provided in the form of microparticles.

The term "microparticles" is understood to mean particles which exhibit a size, namely their diameter in the case of spherical particles or their greatest dimension in the case of anisotropic particles, of a few tens of or a few hundred microns.

The crumbs are usually composed of a composition based on an elastomer and on a filler. They also usually comprise all the ingredients used in rubber compositions, such as plasticizers, antioxidants, vulcanization additives, and the like.

The crumbs can be simple ground/micronized rubber materials, without other treatment. It is also known that these crumbs can undergo a treatment in order to modify them. This treatment can consist of a chemical functionalization or devulcanization modification. It can also be a thermomechanical, thermochemical, biological, and the like, treatment.

Depending on the constituents of the crumbs and on the treatment they may have undergone, they usually have an acetone extract of between 3% and 30% by mass, and a chloroform extract of between 5% and 85% by mass.

In certain documents, the use of particular "regenerated" crumbs ("reclaimed rubber crumbs"), which have a morphology modified by thermal and/or mechanical and/or biological and/or chemical treatment, has been described. These regenerated crumbs generally have an acetone extract of between 5% and 20% by mass, and a chloroform extract of between 15% and 85% by mass, the latter having a mass-average molecular mass (Mw) of greater than 10000 g/mol. In regenerated crumbs, the ratio of the chloroform extract to the acetone extract, expressed as mass percentage, is generally greater than or equal to 2. Lastly, regenerated crumbs have a Mooney viscosity (conventionally expressed in Mooney units, MU) of generally between 40 and 90. These regenerated crumbs, although they have certain known advantages, result from a particular treatment which entails additional product costs and technical characteristics leading to properties which differ from the crumbs which have not undergone such a treatment. As examples of such regenerated crumbs, mention may be made of the commercial products "Wuxi fine reclaim", which has a content of acetone extract of 9% and a content of chloroform extract of 37.2%; or "Nantong HT tire reclaim", which has a content of acetone extract of 12.7% and a content of chloroform extract of 28.3%.

For the purposes of the invention, a specific crumb will be selected exhibiting a ratio of the chloroform extract to the acetone extract of less than 2, and preferably of less than or equal to 1.5; the chloroform and acetone extracts being expressed as percentages by mass.

Preferably, the crumb has an acetone extract of between 3% and 15% by mass, more preferably from 3% to 10% by mass.

Likewise, it is preferable for the crumb to have a chloroform extract of between 3% and 20% by mass, more preferably from 5% to 15% by mass.

Preferably, the chloroform extract of the rubber crumb has a mass-average molecular mass (Mw) of less than 10000 g/mol, preferably of less than 8000 g/mol.

Likewise preferably, the crumb exhibits an average particle size (D50) of between 10 and 400 μm, preferably between 50 and 250 μm and more preferably between 70 and 220 μm.

Preferably for the invention, the crumb which has not undergone any modification by thermal and/or mechanical and/or biological and/or chemical treatment.

Preferably, the crumb of use in the invention comprises a diene elastomer. This elastomer preferably represents at least 30% by mass of the crumb, the percentage being determined according to the standard ASTM E1131. It is preferably selected from the group consisting of polybutadienes, polyisoprenes including natural rubber, butadiene copolymers and isoprene copolymers. More preferably, the molar content of units of diene origin (conjugated dienes) present in the diene elastomer is greater than 50%, preferably between 50% and 70%.

Preferably for the invention, the crumb contains between 5% and 70% by mass of filler, more preferably between 10% and 60%, and very preferably between 15% and 50%.

The term "filler" is understood here to mean any type of filler, whether it is reinforcing (typically having nanometric particles, preferably with a weight-average size of less than 500 nm, in particular between 20 and 200 nm) or whether it is non-reinforcing or inert (typically having micrometric particles, preferably with a weight-average size of greater than 1 μm, for example between 2 and 200 μm). The weight-average size of the nanometric particles is measured in a manner well known to those skilled in the art (by way of example, according to patent application WO 2009/083160 paragraph 1.1). The weight-average size of the micrometric particles can be determined by mechanical sieving.

Mention will in particular be made, as examples of fillers known as reinforcing to those skilled in the art, of carbon black or of a reinforcing inorganic filler, such as silica or alumina in the presence of a coupling agent, or mixtures thereof.

According to a preferred embodiment of the invention, the crumb comprises, by way of filler, a reinforcing filler, in particular a carbon black or a mixture of carbon blacks.

The carbon black or the mixture of carbon blacks preferably represents more than 50%, more preferably more than 80%, even more preferably more than 90% by mass of the weight of the reinforcing filler of the crumb. According to a more preferred embodiment, the reinforcing filler consists of a carbon black or a mixture of carbon blacks.

Very preferably, the carbon black is present in the crumb at a content ranging from 20% to 40% by mass, more preferably from 25% to 35% by mass.

All carbon blacks, in particular blacks of the HAF, ISAF, SAF, FF, FEF, GPF and SRF type, conventionally used in rubber compositions for tires ("tire-grade" blacks) are suitable as carbon blacks.

The crumb can contain all the other usual additives which participate in a rubber composition, in particular for a tire. Among these usual additives, mention may be made of liquid or solid plasticizers, non-reinforcing fillers such as chalk, kaolin, protective agents and crosslinking agents. These additives may be in the crumb in the form both of a residue or of a derivative, since they were able to react during the steps of producing the composition or of crosslinking the composition from which the crumb is derived. In the crumbs of use for the invention, the crosslinking system is preferably a vulcanization system, that is to say based on sulfur (or on a sulfur-donating agent) and on a vulcanization accelerator.

The crumbs of use for the invention are commercially available and those skilled in the art will know how to identify the crumbs of use for the invention, in particular by analysis of the chloroform and acetone extracts and the ratio thereof, as discussed above. Crumbs suitable for the invention include "PD80" from Lehigh Technologies, which has a content of acetone extract of 7% and a content of chloroform extract of 7.3%; or "RNM60" from Rubber Resources, which has a content of acetone extract of 7.4% and a content of chloroform extract of 8.2%.

The crumb itself, if it is not directly commercially purchased, can be obtained according to the grinding or micronization techniques known to those skilled in the art.

The grinding can be carried out by various technologies, for example by a mechanical process of grinding with a Kahl type grinding wheel, or else by cryogenic impact micronization technologies, which make it possible to obtain particles of small size on rubber materials. Commercial items of equipment, such as the CUM150 mill from Netzsch or the CW250 mill from Alpine, can be used.

In the layer of the tire of the invention, the crumb is present at a content from 50% to 100% by mass, preferably from 70% to 100% and more preferably from 81% to 100%. Below 50%, 60% or even 81%, the savings made would not be as advantageous. Thus, very preferably, the amount of crumb is from 85% to 100%, preferably from 91% to 100%, more preferably from 95% to 100%. According to a very preferred embodiment of the invention, the layer of the tire comprises 100% by mass of the specific crumb, that is to say that it is entirely constituted thereof.

In the remainder of the description of the invention, it will be understood that the term composition is used in the embodiments of the invention in which the layer of the tire of the invention comprises other, optional ingredients in addition to the rubber crumb.

Elastomer

According to a preferred embodiment, the composition of the layer of the tire of the invention may comprise an elastomer. Any elastomer known to those skilled in the art can be used, in particular an elastomer selected from thermoplastic elastomers, polyolefins, diene elastomers and mixtures thereof; preferably a diene elastomer will be selected.

Thermoplastic elastomers (abbreviated to "TPEs") are understood to mean the elastomers that have a structure intermediate between thermoplastic polymers and elastomers. They are block copolymers consisting of rigid thermoplastic blocks connected by flexible elastomer blocks.

In a known manner, TPEs have two glass transition temperature peaks (Tg, measured according to ASTM D3418), the lowest temperature relating to the elastomer part of the TPE and the highest temperature relating to the thermoplastic part of the TPE. Thus, the flexible blocks of the TPEs are defined by a Tg which is below ambient temperature (25° C.), while the rigid blocks have a Tg above 80° C.

In order to be both elastomeric and thermoplastic in nature, the TPE has to be provided with blocks which are sufficiently incompatible (that is to say, different as a result of their respective masses, of their respective polarities or of their respective Tg values) to retain their own properties of elastomer or thermoplastic block.

For the elastomer blocks comprising a carbon-based chain, if the elastomer part of the TPE does not comprise an ethylenic unsaturation, it will be referred to as a saturated elastomer block. If the elastomer block of the TPE comprises ethylenic unsaturations (that is to say, carbon-carbon double bonds), it will then be referred to as an unsaturated or diene elastomer block.

It is recalled that an elastomer or rubber (the two terms being in a known way synonymous and interchangeable) of olefinic type should be understood as meaning an elastomer, the elastomeric chain of which is a carbon-based chain consisting of olefin monomer units. The monomers may originate from any olefin known to those skilled in the art, for instance ethylene, propylene, butylene or isobutylene, these monomers optionally being substituted with linear or branched alkyl groups.

"Diene" elastomer (or, without distinction, rubber), whether natural or synthetic, should be understood, in a known way, as meaning an elastomer composed, at least in part (i.e., a homopolymer or a copolymer), of diene monomer units (monomers bearing two conjugated or non-conjugated carbon-carbon double bonds).

These diene elastomers may be classified into two categories: "essentially unsaturated" or "essentially saturated". The term "essentially unsaturated" generally refers to a diene elastomer at least partly derived from conjugated diene monomers having a content of units of diene origin (conjugated dienes) which is greater than 15% (mol %); thus it is that diene elastomers such as butyl rubbers or copolymers of dienes and of α-olefins of EPDM type do not come within the preceding definition and may notably be described as "essentially saturated" diene elastomers (low or very low content, always less than 15%, of units of diene origin).

The term "diene elastomer that may be used in the compositions in accordance with the invention" particularly means:
(a)—any homopolymer of a conjugated or non-conjugated diene monomer having from 4 to 18 carbon atoms;
(b)—any copolymer of a conjugated or non-conjugated diene having from 4 to 18 carbon atoms and of at least one other monomer.

The other monomer may be ethylene, an olefin or a conjugated or non-conjugated diene.

Suitable as conjugated dienes are conjugated dienes having from 4 to 12 carbon atoms, especially 1,3-dienes, such as, in particular, 1,3-butadiene and isoprene.

Suitable as non-conjugated dienes are non-conjugated dienes having from 6 to 12 carbon atoms, such as 1,4-hexadiene, ethylidenenorbornene or dicyclopentadiene.

Suitable as olefins are vinylaromatic compounds having from 8 to 20 carbon atoms and aliphatic α-monoolefins having from 3 to 12 carbon atoms.

Suitable as vinylaromatic compounds are, for example, styrene, ortho-, meta- or para-methylstyrene, the "vinyltoluene" commercial mixture or para-(tert-butyl)styrene.

Suitable as aliphatic α-monoolefins are in particular acyclic aliphatic α-monoolefins having from 3 to 18 carbon atoms.

More particularly, the diene elastomer is:
(a')—any homopolymer of a conjugated diene monomer, in particular any homopolymer obtained by polymerization of a conjugated diene monomer having from 4 to 12 carbon atoms;
(b')—any copolymer obtained by copolymerization of one or more conjugated dienes with one another or with one or more vinylaromatic compounds having from 8 to 20 carbon atoms;
(e)—a copolymer of isobutene and of isoprene (butyl rubber) and also the halogenated versions, in particular chlorinated or brominated versions, of this type of copolymer;
(d')—any copolymer obtained by copolymerization of one or more conjugated or non-conjugated dienes with ethylene, an α-monoolefin or a mixture thereof, for instance the elastomers obtained from ethylene, from propylene with a non-conjugated diene monomer of the abovementioned type.

Preferably, the diene elastomer is selected from the group consisting of polybutadienes (BRs), natural rubber (NR), synthetic polyisoprenes (IRs), butadiene copolymers, isoprene copolymers and the mixtures of these elastomers. The butadiene copolymers are particularly selected from the group consisting of butadiene/styrene copolymers (SBRs).

Crosslinking System

According to a preferred embodiment, the composition of the layer of the tire of the invention may comprise a crosslinking system. In this respect, any type of crosslinking system known to those skilled in the art for rubber compositions for tires may be used. It can in particular be based on sulfur, and/or on peroxide and/or on bismaleimides.

Preferably, the crosslinking system is based on sulfur; it is then called a vulcanization system. The sulfur can be contributed in any form, in particular in the form of molecular sulfur, or of a sulfur-donating agent. At least one vulcanization accelerator is also preferably present, and, optionally, also preferably, use may be made of various known vulcanization activators, such as zinc oxide, stearic acid or equivalent compound, such as stearic acid salts, and salts of transition metals, guanidine derivatives (in particular diphenylguanidine), or also known vulcanization retarders.

The sulfur is used at a preferred content of between 0.5 and 12 phr, in particular between 1 and 10 phr. The vulcanization accelerator is used at a preferred content of between 0.5 and 10 phr, more preferably of between 0.5 and 5.0 phr.

Use may be made, as accelerator, of any compound capable of acting as accelerator of the vulcanization of diene elastomers in the presence of sulfur, in particular accelerators of the thiazole type, and also their derivatives, or accelerators of sulfenamide, thiuram, dithiocarbamate, dithiophosphate, thiourea and xanthate types. Mention may in particular be made, as examples of such accelerators, of the following compounds: 2-mercaptobenzothiazyl disulfide (abbreviated to "MBTS"), N-cyclohexyl-2-benzothiazole-sulfenamide ("CBS"), N,N-dicyclohexyl-2-benzothiazole-sulfenamide ("DCBS"), N-(tert-butyl)-2-benzothiazole-sulfenamide ("TBBS"), N-(tert-butyl)-2-benzothiazolesulfenimide ("TBSI"), tetrabenzylthiuram disulfide ("TBZTD"), zinc dibenzyldithiocarbamate ("ZBEC") and the mixtures of these compounds.

Other Possible Additives

The layers of the tire according to the invention may optionally also comprise all or some of the usual additives customarily used in elastomer compositions intended in particular for the manufacture of tires, such as, for example, reinforcing or non-reinforcing fillers, pigments, protective agents, such as antiozone waxes, chemical antiozonants or antioxidants, plasticizing agents, antifatigue agents, reinforcing resins, methylene acceptors (for example, phenol novolac resin) or methylene donors (for example, HMT or H3M).

It goes without saying that the invention relates to the rubber compositions described previously both in the "uncured" or non-crosslinked state (i.e., before curing) and in the "cured" or crosslinked, or also vulcanized, state (i.e., after crosslinking or vulcanization).

Preparation of the Layers of the Tire According to the Invention

When the amount of crumb is 100% by mass of the layer of the tire, that is to say that there is only crumb in said layer, the preparation of this layer can be carried out by sintering crumb. Sintering may also be used when the crumb content is greater than 80% by mass, in the presence of 20% of other ingredients such as elastomers.

"Sintering rubber crumb" is understood to mean a step of shaping a predetermined amount of crumb by heating at an elevated temperature and at the same time pressurizing this amount of crumb in the cavity of a mold. The step of sintering the crumb takes place in a mold and preferably without addition of vulcanization additive. More particularly, it is a solid-state sintering of the crumb grains, in other words, a cohesion of the grains by heating at an elevated temperature of a compaction of the pressurized grains of rubber crumb. Heating and pressurization of the crumb create a sintered compact agglomerate of crumb particles. Thus, the compression creates a physical coming together of the particles and the heating promotes molecular mobility and therefore this coming together via the interpenetration of the elastomer chains of the crumbs. Under the effect of the temperature, there may also be elastomer chain scissions, in particular at the surface of the crumbs. These elastomer chains recombine with each other to create chemical bonds between the grains of rubber crumb, and to ensure the cohesion of the material.

Preferably, the crumb and the optional other ingredients are introduced into the mold and subjected to a nominal temperature of between 100° C. and 210° C., preferably from 150° C. to 200° C., and to a nominal pressure of between 20 and 200 bar for a time period of between 2 and 15 minutes.

A rubber profiled element is thus obtained, the shape and dimensions of which are defined by those of the sintering cavity of the mold, and the density of which is controlled, the latter being directly connected to the crumb compaction pressure. These products can subsequently be used for the manufacture of semi-finished products for the manufacture of tires, according to techniques known to those skilled in the art.

In cases where a layer comprising 100% of crumb is prepared by sintering, in the absence of any other ingredient and of chemical transformation of the crumb during the sintering, the article obtained by sintering has the same composition as that of the original crumb. It is also possible to prepare layers comprising other ingredients, and more than 80% by mass of crumb, by sintering.

When the amount of crumb is not 100%, that is to say when the layer of the tire of the invention comprises other ingredients such as elastomers, said layer therefore being a composition, the layers can be prepared by means known to those skilled in the art for the preparation of rubber compositions. In particular, the compositions can be manufactured in suitable mixers, by carrying out a phase of thermomechanical working or kneading at high temperature, up to a maximum temperature of between 110° C. and 200° C., preferably between 130° C. and 180° C.

Such a preparation method can for example be used for compositions comprising, by mass, from 50% to 95% of crumb, preferably from 50% to 90% and in particular from 50% to 85%.

In the case where a crosslinking system is included in the composition, the phase of thermomechanical working described above can be followed by a second phase of mechanical working (sometimes referred to as "productive" phase) at a lower temperature, typically below 110° C., for example between 60° C. and 100° C., during which finishing phase the crosslinking or vulcanization system is incorporated.

The final composition thus obtained can subsequently be calendered, for example in the form of a sheet or slab, in particular for laboratory characterization, or else extruded, in order to form, for example, a rubber profiled element used in the manufacture of semi-finished products for tires. These products can subsequently be used for the manufacture of tires, according to techniques known to those skilled in the art.

The examples that follow illustrate the invention without, however, limiting it.

Implementation Examples of the Invention:

Characterization of the rubber crumbs and of the rubber compositions of the examples In the examples, the rubber crumbs are characterized as indicated below.

Measurement of the Size of the Particles:

The size of the particles (in particular the D50) can be measured using a laser particle size analyzer of the mastersizer 3000 type from Malvern. The measurement is carried out by the liquid route, dispersed in alcohol after an ultrasound pretreatment for 1 min in order to guarantee the dispersion of the particles. The measurement is carried out in accordance with standard ISO-13320-1.

Measurement of the Acetone Extract:

The acetone extract content is measured according to standard ISO1407 by means of an extractor of Soxhlet type.

A sample test specimen (between 500 mg and 5 g) is introduced into an extraction thimble and then placed in the extractor tube of the Soxhlet. A volume of acetone equal to two or three times the volume of the extractor tube is placed in the collector of the Soxhlet. The Soxhlet is subsequently assembled and then heated for 16 h.

The sample is weighed after extraction. The acetone extract content corresponds to the loss of mass of the sample during the extraction, related back to the initial mass thereof.
Measurement of the Chloroform Extract:

The chloroform extract content is measured according to standard ISO1407 by means of an extractor of Soxhlet type.

A sample test specimen (between 500 mg and 5 g) is introduced into an extraction thimble and then placed in the extractor tube of the Soxhlet. A volume of chloroform equal to two or three times the volume of the extractor tube is placed in the collector of the Soxhlet. The Soxhlet is subsequently assembled and then heated for 16 h.

The sample is weighed after extraction. The chloroform extract content corresponds to the loss of mass of the sample during the extraction, related back to the initial mass thereof.
Measurement of the Average Molecular Masses of the Chloroform Extract:

The molecular masses are determined by size exclusion chromatography, according to a Moore calibration and according to standard ISO16014.

The measurement of the weight-average molecular mass (Mw) of the chloroform extract is carried out by size exclusion chromatography (SEC) with a refractive index (RI) detector. The system is composed of an Alliance 2695 system from Waters, of a column oven from Waters and also of an RI 410 detector from Waters. The set of columns used is composed of two PL GEL MIXED D columns (300×7.5 mm 5 µm) followed by two PL GEL MIXED E columns (300×7.5 mm 3 µm) from Agilent. These columns are placed in a column oven thermostatically controlled at 35° C. The mobile phase used is non-antioxidized tetrahydrofuran. The flow rate of the mobile phase is 1 ml/min. The RI detector is also thermostatically controlled at 35° C.

The chloroform extract is dried under a nitrogen stream. The dry extract is subsequently taken up at 1 g/l in non-antioxidized tetrahydrofuran at 250 ppm with stirring for 2 hours. The solution obtained is filtered using a syringe and a single-use 0.45 µm PTFE syringe filter. 100 µl of the filtered solution are injected into the conditioned chromatographic system at 1 ml/min and 35° C.

The Mw results are provided by integration of the chromatographic peaks detected by the RI detector above a value of 2000 g/mol. The Mw is calculated from a calibration carried out using polystyrene standards.
Measurement of the Mass Fraction of Carbon Black:

The carbon black mass fraction is measured by thermogravimetric analysis (TGA) according to standard NF T-46-07, on an instrument from Mettler Toledo, model "TGA/DSC1". Approximately 20 mg of sample are introduced into the thermal analyzer, then subjected to a thermal program from 25 to 600° C. under an inert atmosphere (pyrolyzable phase), then from 400 to 750° C. under an oxidizing atmosphere (oxidizable phase). The mass of the sample is measured continuously throughout the thermal program. The black content corresponds to the loss of mass measured during the oxidizable phase related back to the initial mass of sample.

In the examples, the layers of the tire according to the invention are characterized, before and/or after curing, as indicated below.
Tensile Tests (after Curing)

These tensile tests make it possible to determine the moduli of elasticity and the properties at break and are based on standard NF ISO 37 of December 2005.

The nominal secant modulus (or apparent stress, in MPa, relative to the strain, which is unitless) is measured at 23° C. in second elongation (i.e., after an accommodation cycle at the extension rate provided for the measurement itself) at 10% elongation (denoted MA10).

The stress, in MPa, and the strain at break, in %, are measured at 60° C.
Rubber Compositions Compositions C1 to C12 are manufactured with introduction of all of the constituents (except for the crosslinking ingredients) into an internal mixer, with a phase of thermo-mechanical working, up to a temperature of 130° C., a phase of introduction of the vulcanization system at a lower temperature, and a phase of curing at 150° C. Composition C13 is prepared by sintering, at a temperature of 180° C. and a pressure of 100 bar.

The object of the examples presented in table 1 is to compare the different rubber properties of the control compositions (C1 to C5) to the properties of the compositions in accordance with the invention (C6 to C13). The crumbs are presented in table 2 and the properties measured before and after curing are presented in table 3.

TABLE 1

| Compositions | C1 | C2 | C3 | C4 | C5 | C6 | C7 | C8 | C9 | C10 | C11 | C12 | C13 |
|---|---|---|---|---|---|---|---|---|---|---|---|---|---|
| NR | 87.6 | 79 | 70 | 57.5 | 48 | 39.4 | 30 | 30 | 30 | 16.4 | 16.4 | 16.4 | 0 |
| Crumb 1 | 0 | 10 | 20.2 | 34.5 | 45.2 | 55 | 65.8 | | 0 | 81.4 | 0 | 0 | 0 |
| Crumb 2 | 0 | 0 | 0 | 0 | 0 | 0 | 0 | 65.8 | 0 | 0 | 81.4 | 0 | 0 |
| Crumb 3 | 0 | 0 | 0 | 0 | 0 | 0 | 0 | 0 | 65.8 | 0 | 0 | 81.4 | 0 |
| Crumb 4 | 0 | 0 | 0 | 0 | 0 | 0 | 0 | 0 | 0 | 0 | 0 | 0 | 100 |
| S | 4.4 | 3.9 | 3.5 | 2.9 | 2.4 | 2.0 | 1.5 | 1.5 | 1.5 | 0.8 | 0.8 | 0.8 | 0 |
| CBS | 4.4 | 3.9 | 3.5 | 2.9 | 2.4 | 2.0 | 1.5 | 1.5 | 1.5 | 0.8 | 0.8 | 0.8 | 0 |
| ZnO | 1.8 | 1.6 | 1.4 | 1.1 | 1.0 | 0.8 | 0.6 | 0.6 | 0.6 | 0.3 | 0.3 | 0.3 | 0 |
| Stearic acid | 1.8 | 1.6 | 1.4 | 1.1 | 1.0 | 0.8 | 0.6 | 0.6 | 0.6 | 0.3 | 0.3 | 0.3 | 0 |

TABLE 2

| | Commercial name | Supplier | Acetone extract content | Chloroform extract content | D50 |
|---|---|---|---|---|---|
| Crumb 1 | "OG80" | CL PELLING | 7.2 mol % | 7.9 mol % | 180 µm |
| Crumb 2 | "80BDRM" | Lehigh | 10.7 mol % | 12.7 mol % | 142 µm |
| Crumb 3 | "PD80" | Lehigh | 7.0 mol % | 7.3 mol % | 184 µm |
| Crumb 4 | "RMN60" | Rubber Resources | 7.4 mol % | 8.2 mol % | 209 µm |

TABLE 3

|  | C1 | C2 | C3 | C4 | C5 | C6 | C7 | C8 | C9 | C10 | C11 | C12 | C13 |
|---|---|---|---|---|---|---|---|---|---|---|---|---|---|
| MA10 23° C. | 2.22 | 2.67 | 3.06 | 3.41 | 3.92 | 4.35 | 4.99 | 4.99 | 4.71 | 4.48 | 4.56 | 4.10 | nm* |
| Elongation at break (%) | 84 | 100 | 103 | 137 | 180 | 215 | 233 | 211 | 218 | 345 | 303 | 212 | 400 |
| Breaking stress (MPa) | 1.4 | 1.6 | 2 | 3 | 5.2 | 7.3 | 9 | 10.6 | 6.6 | 12.6 | 11.7 | 5.3 | 8 |

Compared to the control compositions, it is noted that the compositions in accordance with the invention make it possible to improve the modulus and the properties at break: stress and strain.

The invention claimed is:

1. A tire comprising a rubber layer comprising from 50% to 100% by mass of a rubber crumb having a ratio of a chloroform extract to an acetone extract of less than 2, the chloroform and acetone extracts being expressed as percentages by mass.

2. The tire according to claim 1, wherein the rubber crumb is present at a content from 70% to 100% by mass.

3. The tire according to claim 1, wherein the rubber crumb is present at a content from 81% to 100% by mass.

4. The tire according to claim 1, wherein the rubber crumb is present at a content from 85% to 100% by mass.

5. The tire according to claim 1, wherein the rubber crumb is present at a content from 91% to 100% by mass.

6. The tire according to claim 1, wherein the rubber crumb has a ratio of the chloroform extract to the acetone extract of less than or equal to 1.5.

7. The tire according to claim 1, wherein the rubber crumb has an acetone extract of between 3% and 15% by mass.

8. The tire according to claim 1, wherein the rubber crumb has an acetone extract of from 3% to 10% by mass.

9. The tire according to claim 1, wherein the rubber crumb has a chloroform extract of between 3% and 20% by mass.

10. The tire according to claim 1, wherein the rubber crumb has a chloroform extract of from 5% to 15% by mass.

11. The tire according to claim 1, wherein the chloroform extract of the rubber crumb has a mass-average molecular mass (Mw) of less than 10,000 g/mol.

12. The tire according to claim 1, wherein the chloroform extract of the rubber crumb has a mass-average molecular mass (Mw) of less than 8,000 g/mol.

13. The tire according to claim 1, wherein the rubber crumb exhibits an average particle size (D50) of between 10 and 400 μm.

14. The tire according to claim 1, wherein the rubber crumb exhibits an average particle size (D50) of between 50 and 250 μm.

15. The tire according to claim 1, wherein the rubber crumb exhibits an average particle size (D50) of between 70 and 220 μm.

16. The tire according to claim 1, wherein the rubber crumb has not undergone modification by a treatment selected from the group consisting of thermal, mechanical, biological, chemical or combinations thereof.

17. The tire according to claim 1, wherein the rubber layer further comprises an elastomer.

18. The tire according to claim 1, wherein the rubber layer further comprises a component selected from the group consisting of thermoplastic elastomers, polyolefins, diene elastomers and mixtures thereof.

* * * * *